M. LEITCH.
BOWL CASING DRAIN FOR CREAM SEPARATORS.
APPLICATION FILED FEB. 11, 1916.
1,212,370.
Patented Jan. 16, 1917.
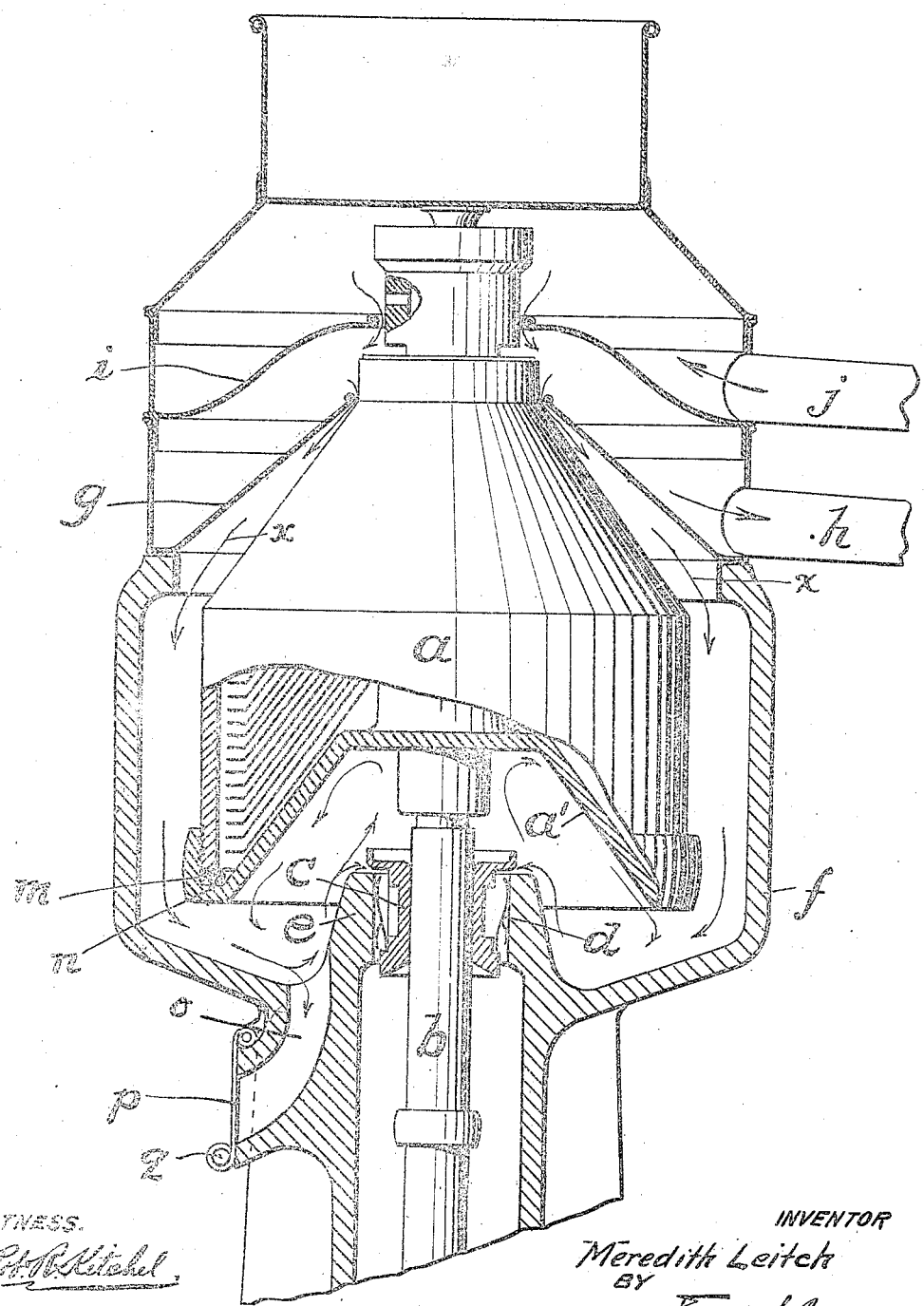
WITNESS.
INVENTOR
Meredith Leitch
BY
Frank S. Busser
ATTORNEY

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

BOWL-CASING DRAIN FOR CREAM-SEPARATORS.

1,212,370.　　　　Specification of Letters Patent.　　Patented Jan. 16, 1917.

Application filed February 11, 1916.　Serial No. 77,560.

*To all whom it may concern:*

Be it known that I, MEREDITH LEITCH, a citizen of the United States, residing at Poughkeepsie, county of Dutchess and State of New York, have invented a new and useful Improvement in Bowl-Casing Drains for Cream-Separators, of which the following is a full, clear, and exact description, reference being had to the accompanying drawings, which form a part of this specification.

In the operation of centrifugal cream separators a frequent source of trouble is the passage into the frame of the machine of milk and water, which mix with the oil and destroy its lubricating qualities. This trouble is usually due to the escape into the bowl casing from the bowl of milk during the separating process, or to the use of an excessive quantity of water in washing out of the bowl casing. These difficulties can be overcome by allowing a free drain from the bowl casing, but if this were done it would permit the establishment of air currents whose effect would be to cause more or less mixing of the separated cream with the separated skim milk during the passage of the same from the bowl to the discharge spouts, as will be hereinafter more fully explained.

The object of my invention is to allow any substantial quantities of milk or water that may find their way into the bowl casing to readily escape and at the same time prevent the establishment of detrimental air currents.

In order that the causes of trouble and the difficulties attending their removal may be fully understood, it will be necessary to first describe in some detail certain old and well known features of separator construction. Such features will be best understood by reference to the accompanying drawing, in which the figure is a vertical sectional view of a cream separator embodying my invention.

The separator bowl $a\ a'$ is carried on and driven by the spindle $b$. The upper end of the spindle rotates in a bearing $c$ supported by a spring $d$ held by a boss $e$ projecting upward above the bottom of the bowl casing $f$.

$g$ is the hopper and $h$ the spout of the skim milk cover, and $i$ is the hopper and $j$ the spout of the cream cover.

$m$ is the usual rubber bowl ring which is placed in a groove $n$ formed in the bottom $a'$ of the bowl $a$, its purpose being to form a perfectly tight joint between the bowl body and the bowl bottom $a'$. It frequently happens that the operator forgets to place the ring in its groove and when the milk is fed to the machine it escapes into the bowl casing. It is also quite common, as before mentioned, to use more water than is necessary to properly wash out the bowl casing. It may be readily seen that, with no provision for the free drain of the milk and water from the casing, either of these conditions allows the escape of water or oil into the machine frame, with resultant admixture with the lubricant as before mentioned. On the other hand, separator manufacturers avoid the provision of such a free drain because of the detrimental air currents that would otherwise be created, the nature of which will now be explained.

When in operation the bowl $a$ revolves at high speed and, acting as a fan, causes air to move outward under the hopper $g$ of the skim milk cover as indicated by the arrows $x$. This air moves downward at the side of the bowl and, because the clearance is enough to let it escape the maximum influence of the bottom of the bowl, moves inward and causes a pressure greater than atmospheric in the entire lower part of the bowl casing. A very little air escapes downward past the top bearing spring into the frame, but the largest outlet from this space would be any drain opening that may be provided. All air that escapes by these outlets must come around the bowl neck from the skim milk cover. The skim milk passes through its cover in a spray which enters the skim milk cover in a spray which enters the skim milk spout with such speed that it prevents any air inlet there, so all air must enter at the cream spout and pass downward around the upper part of the bowl neck, as shown by the arrows.

It frequently happens that the careless use of the cream screw adjusting wrench causes a slight roughness of the cream outlet hole. This will cause part of the cream to break up into such a fine spray that any strong current of air from the cream cover to the skim milk cover will carry cream with it. This cream is caught with and will be found in the skim milk in spite of perfect skimming by the bowl.

From the above explanation of the air currents existing in a cream separator, the importance of reducing all air outlets to a minimum may be readily understood. On the other hand, it is also important, as hereinbefore explained, to provide a liberal sized liquid drain from the bowl casing. These contradictory conditions might be fulfilled by making a trapped outlet that would be sealed by a small quantity of water or milk. Many machines, however, are used in barns and other exposed places, and such a trap might soon fill with dust, or in winter the water might freeze and break the machine. In my invention the said contradictory conditions are satisfied by the provision of a large drain hole or passage $o$ from the bottom of the bowl casing relatively close to its center, which drain passage is normally closed by a metal flap or cover $p$ which is hinged, at its top, back of the face of the outlet from the passage so as to rest with considerable pressure against said face. This drain is of ample size to carry away the maximum quantity of liquid liable to enter the bowl casing and to allow chaff, large flies, etc., to readily pass through. It is also made of a tapering cross section, larger at the bottom than at the top, so that anything that can enter at the top will readily pass through and out at the bottom. To further increase the pressure of the cover against the face of the outlet, the cover is weighted at $q$.

It is found that, with the parts proportioned substantially as indicated in the drawings, the closing tendency of the flap or cover $p$ is sufficient to resist the maximum air pressure that is ordinarily produced during the rotation of the bowl, allowing the air pressure to build up, as hereinbefore described, in the bottom of the casing and preventing the establishment of detrimental air currents. At the same time the closing tendency of the flap or cover is not so great that it will not be readily overcome by the pressure of liquid in the drain passage. Hence the escape of milk and water into the machine frame is effectually prevented.

Having now fully described my invention, what I claim and desire to protect by Letters Patent is:

1. In a cream separator, the combination with a revoluble separator bowl, of a stationary bowl casing surrounding the separator bowl and spaced therefrom, stationary skim milk and cream covers superimposed upon the casing, the separator bowl being provided with skim milk and cream discharge outlets, there being an opening in the bowl casing below the bowl, the arrangement being such as to tend to establish air currents past the liquid outlets and through such opening thereby tending to cause an admixture of cream with the skim milk, and automatically acting means normally closing said opening and thus building up air pressure to minimize the establishment of said air currents but adapted to yield under pressure of liquid to open the passage and permit the liquid to escape.

2. In a centrifugalizing machine, the combination with a revoluble centrifugalizing bowl provided with an outlet, of a stationary bowl casing surrounding the centrifugalizing bowl and spaced therefrom, stationary covers superimposed upon the casing and adapted to receive the material discharged from the centrifugalizing bowl outlet, there being an opening in the bowl casing below the bowl, the arrangement being such as to tend to establish air currents past the bowl outlet and through such opening, thereby tending to cause a discharge of material below the covers, and automatically acting means normally closing said opening and thus building up air pressure to minimize the establishment of said air currents but adapted to yield under pressure of liquid to open the passage and permit the liquid to escape.

In testimony of which invention, I have hereunto set my hand, at Poughkeepsie, N. Y., on this 7 day of Feby, 1916.

MEREDITH LEITCH.

Witnesses:
C. L. POWELL,
E. LOUNSBERY DuBois.